United States Patent [19]

Jacob

[11] 3,737,818

[45] June 5, 1973

[54] MATRIX TUNING SYSTEM

[75] Inventor: Abraham H. Jacob, Longmeadow, Mass.

[73] Assignee: General Instruments Corporation, Newark, N.J.

[22] Filed: July 23, 1971

[21] Appl. No.: 165,609

[52] U.S. Cl. ....................334/11, 307/273, 307/291, 334/15, 340/166 R

[51] Int. Cl. ....................H03j 5/04

[58] Field of Search ....................334/1, 15, 11; 328/67; 307/237, 293, 273, 291; 325/422, 458, 459, 462, 465, 468; 340/166 R

[56] References Cited

UNITED STATES PATENTS

| | | | |
|---|---|---|---|
| 2,405,843 | 8/1946 | Moe | 328/67 X |
| 3,333,175 | 7/1967 | Klyce | 307/293 X |
| 3,621,296 | 11/1971 | Berger | 328/67 X |
| 3,503,018 | 3/1970 | Cavanagh | 334/15 |
| 3,652,960 | 3/1972 | Sakamoto et al. | 334/15 |
| 3,568,112 | 3/1971 | Thomas | 334/1 |
| 3,528,044 | 9/1970 | Manicki | 334/15 |
| 3,064,237 | 11/1962 | Schubert | 340/166 R |
| 3,560,941 | 2/1971 | Wallace, Jr. | 340/166 R X |
| 3,654,557 | 4/1972 | Sakamoto et al. | 334/15 X |

*Primary Examiner*—Paul L. Gensler
*Attorney*—Maxwell James, and Harold James

[57] ABSTRACT

A standardized tuning structure is disclosed which is capable of being digitally tuned to correspond to selected communication channels, the standardized construction being adaptable for use in connection with whatever communication channels, in whatever band range, may be present in a given locality. Thus while there may be some eighty or more available channels, with only a small number of them available in a given locality, the standardized matrix-type tuning system can be used in any locality simply by making appropriate electrical connections to a terminal board. All-electrical circuitry is provided to effect the desired tuning and band selection, that circuitry including a novel pulse-producing circuit specially adapted to cooperate with touch-type switches, and also including flip-flop circuits and AND-gates for controlling band and channel selection and appropriate tuning within the communication receiver.

20 Claims, 5 Drawing Figures

Figure 1:
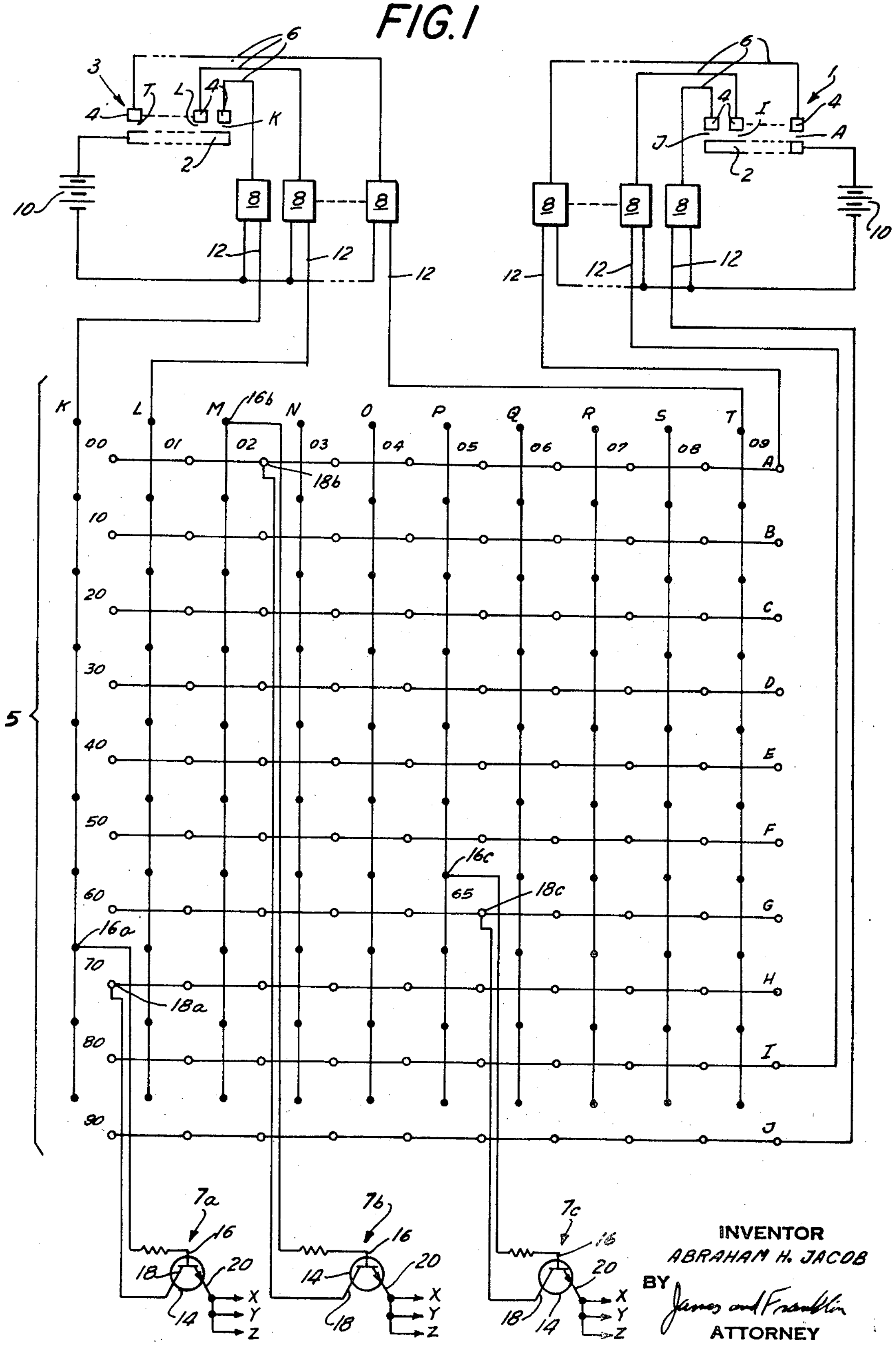

INVENTOR
ABRAHAM H. JACOB
BY James and Franklin
ATTORNEY

Patented June 5, 1973

3,737,818

3 Sheets-Sheet 2

INVENTOR
ABRAHAM H. JACOB
BY James and Franklin
ATTORNEY

INVENTOR
ABRAHAM H. JACOB
BY James and Franklin
ATTORNEY

MATRIX TUNING SYSTEM

The present invention relates to a tuning system which may be manufactured in standardized fashion so as to be adaptable for use in tuning a communication receiver to a selected relatively small number of available communication channels, where the number of potential channels available is much greater than the number to be actually tuned. The system is further designed for use in connection with digital tuning and with touch-sensitive switches.

In the VHF and UHF television bands there are presently over eighty different assigned communication channels, each channel corresponding to a different communication frequency. Each of these channels is identified by a number. When a person with a receiver wishes to tune to a particular channel, he will select that channel by its identifying number, and he will want to tune the set in accordance with that number. In any given locality, however, not all of the available channels will be operative. Perhaps only three of four VHF channels and five or six UHF channels will be operative, and the numbers of the operative channels will be haphazardly scattered over the gamut of identifying numbers previously mentioned, with the VHF channels bearing numbers from 2 to 13 and the UHF channels bearing higher numbers. Other localities may have as many as eighteen channels, and each of them, too, will be identified by numbers distributed between 1 and, for example, 83.

This presents a major problem to the set manufacturer. He must manufacture sets which can be used in all localities, but those sets must be readily adaptable to tune the particular VHF and UHF channels which are available in the locality of interest.

The problem is complicated by the fact that the number and identification of channels available in a given locality are not static. New channels appear from time to time and old channels disappear. The set construction must be such that it can readily be adapted to these changes in existing conditions in each locality.

Convenience in tuning is also a major factor in determining which set a particular customer will buy. There are two aspects to convenience. The first is identifying the particular channel to be tuned, and the second is the amount of effort involved in actuating the tuning system to effect the desired tuning. In the VHF field, the limited number of channels available makes the first convenience aspect not too important — twelve identified selection units can be provided, with those inappropriate to a given locality simply being not used — but in the UHF field, with fifty or sixty different channels potentially available, the problem of designing a set to selecting the desired channels is much more difficult to resolve — it is impractical to provide 60 selection units when only three or four may be used. Digital tuning — tuning in which the user selects the units and tens numbers corresponding to the identifying number of the desired channel — has been proposed, and banks of units and tens selector switches are known, but in the prior art the circuitry utilized to translate switch actuation into actual tuning effect have been quite complicated and expensive, and those circuits have, moreover, proved very difficult to modify from one locality to another in order to accommodate the tuning system to the particular channels available in that locality.

Moreover, the types of digital tuning selector systems heretofore available have in general required the exertion of appreciable force on the part of the user of the device. Touch-type switches are known, and have been used for many purposes such as, for example, summoning an elevator to a particular floor; such switches require practically no physical effort on the part of the user, other than merely placing his finger in the proper location for the number, in the units or tens category, which he wishes to select, but that type of switch has presented a serious problem of reliability insofar as its applicability to tuning systems is concerned. The degree to which the operator may press his finger against the appropriate location, and the degree to which his finger may be properly or improperly aligned with the proper position, will affect the circuit action which is produced by his finger, and if that circuit action is not sufficiently strong, the tuning system will not be appropriately actuated. On the other hand, if the tuning system is made sensitive enough to react to almost any touch by the operator, then it will be subject to faulty operation in response to spurious types of actuation or spurious signals haphazardly arising in the system, and hence the tuning will not be reliable. Moreover, it may take a certain discrete time for the tuning circuit to become actuated, and it is very undesirable, and in many respects impractical, for the operator of the tuning system to keep his finger on the appropriate switch for that discrete period of time. This is particularly the case where the operator must select both a unit and a tens numeral. For one-hand operation, which is the preferred type of operation, one must actuate first the tens switch and then the units switch, and it would be onerous to require the operator to keep his fingers on both of those switches simultaneously.

It is the prime object of the present invention to devise a tuning system, particularly adaptable for use in conjunction with the selection of VHF and/or UHF television channels but not necessarily limited thereto, which can be manufactured in standardized form and which can very readily be adapted in the field to correspond to the requirements of tuning in a particular locality.

It is another object of the present invention to devise a tuning system which can be digitally tuned, and which is provided with circuits which are positive and reliable in operation and which may readily be adapted to tune different channels when they are actuated.

It is yet another object of the present invention to devise a tuning system adapted for use in conjunction with touchtype switches, where provision is made for actuating the utilization circuits corresponding to each of the switches in a reliable manner despite the fact that the switches involved may not always be actuated with a high degree of precision.

It is a further object of the present invention to devise an electrical tuning system which can be used for tuning both the VHF and UHF television channels (or any other stations in different bands of frequencies and requiring different or differently modified tuning circuitry), and for tuning them in a digital fashion, simply by channel or other identifying number, with the tuning system automatically modifying the tuner to actuate either the VHF tuning circuitry or the UHF tuning circuitry.

In accordance with the above, an array of switches, preferably of the touch-type, is provided, that array being in digital form, with one set of switches corresponding to the units numerals and the other set of switches corresponding to the tens numerals. By actuating the appropriate units and tens switches the operator of the system will identify the channel to which he wishes the system to be tuned. Each of those switches, when actuated, will produce a signal. A connection point matrix is provided, the points in the matrix corresponding to the units and tens numerals of the respective switches, those points being arranged in pairs, one point of each pair being connected to an appropriate units switch and the other point of that pair being connected to an appropriate tens switch, so that there are as many such pairs of appropriate connection points as there are numbers in the digital tuning system. The two connection points of each of these pairs of points corresponding to particular digital numbers are connected to an AND gate of any appropriate construction. That AND gate will be energized to provide an output ony when both of the inputs thereto are energized, and hence only when that particular number two digit to which it is connected is selected by the operator of the receiving set. In a given tuning system there will be some predetermined number of such AND gates which will be usually far fewer than the number of available channels to be tuned. Thus while, for example, 83 channel numbers may be available, a given receiving set may be designed to tune only ten or eighteen or even five channels. In a given locality, where, for example, VHF channels 2 and 7 and UHF channels 33 and 76 are available, only four of the AND gates will be made operative and they will be connected only to those pair of matrix connection points corresponding respectively to the identifying numbers of those channels. Hence each of the operative AND gates will be actuated only when the proper number corresponding to the particular channel involved has been selected by the operator. If the operator should select a number which does not correspond to one of the channels available in the area, that will have no effect on the tuning system.

Once a given AND gate has been actuated in the fashion described, it will in turn energize appropriate tuning instrumentalities. In the form here specifically disclosed, those tuning instrumentalities are constituted by all-electric transistor circuitry which effects UHF-VHF band selection, high band and low band selection within the VHF band when appropriate, and the particular frequency selection for the specific channel selected through actuation of the switch array.

In order to ensure that proper switch actuation is effected even if the operator does not place his finger in exactly the right spot on the switch array panel, a special pulse-producing circuit is provided, one such circuit being associated with each of the switches, that circuit being designed to produce a series of pulses of appropriate strength whenever the switch is actuated, even if the actuation of the switch should only be marginal. The pulses are strong, thus ensuring positive circuit actuation, but they present no hazard to the operator. These pulses in turn actuate a flip-flop circuit, causing it to shift from one status or condition to another when an operative pulse is received, and the output of the flip-flop circuit goes to the corresponding AND gate. Each flip-flop circuit, once it has shifted to its second condition, thereby to provide an actuating signal for the AND gate to which it is connected, will remain in that condition until such time as a new switch selection is effected, the new switch selection, in causing its flip-flop to shift to said second condition, actuating a reset generator which causes all of the other flip-flops either to remain in or to revert to their first condition. The combination of a reliable pulse circuit energized by actuation of a touch switch, with the pulse actuating a flip-flop circuit, which then remains in its actuated condition in order to provide an appropriate signal to an AND gate, renders the system here disclosed highly reliable both from a point of view of maintenance and functioning or operation.

While as here disclosed pulse-producing and flip-flop circuits are provided for each of the switches involved (and for a digital tuning system operating in the units and tens area twenty such switches will be required), the circuitry involved is simple and readily adaptable to integrated circuit construction, so that fabrication thereof is neither difficult nor expensive. Because of the combination of the digital tuning arrangement with the connection matrix, with a preselected number of AND gates being connected only to those particular pairs of connection points on the matrix appropriate to the particular locality, and therefore corresponding to the identification numbers of the channels available in that locality, a single standardized construction may be manufactured by the set manufacturer, and the adaptation of that structure to the needs of a particular locality can be readily carried out in the field by installation or repair personnel who have only minimal technical skills.

As here specifically disclosed, the tuner itself may be varactor tuned. Varactors are devices which have different degrees of capacitance depending upon the bias signal applied thereto, and each of the AND gates may be associated with a particular bias-applying circuit which can readily be pre-adjusted, as by means of a potentiometer or other simple controllable voltage-producing device, so as to produce that biasing voltage appropriate to the tuning of a particular local channel corresponding to the connections to the switches which actuate that particular AND gate.

Thus the circuitry involved may in effect be entirely electrical in operation, with no mechanical moving parts whatsoever, and the circuit can be digitally tuned by means of an array of switches, even when those switches are of the touch-tuning type, the system being effective not only to tune particular channels within a given band, but also to condition the system for the desired band and even for sub-bands within a given band.

Figure 2:
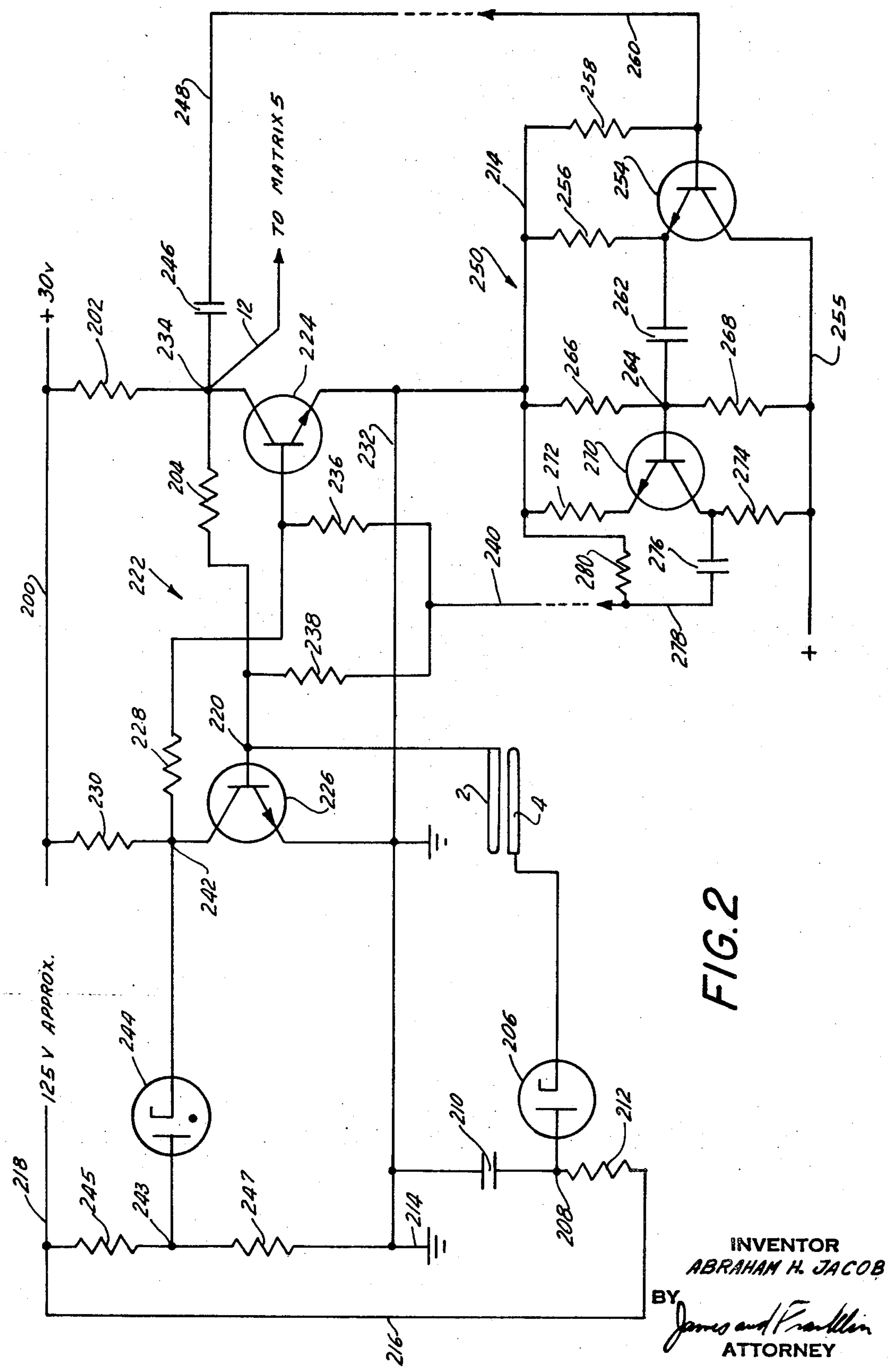
Figure 3B:
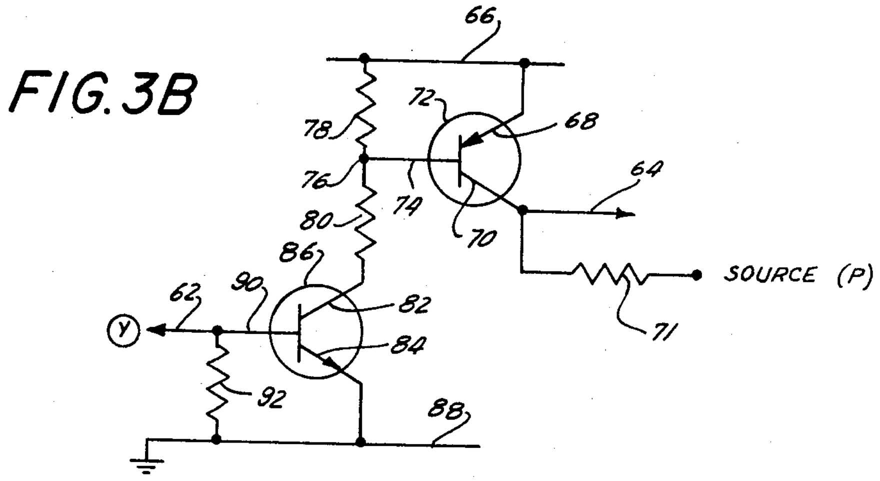
Figure 3A:
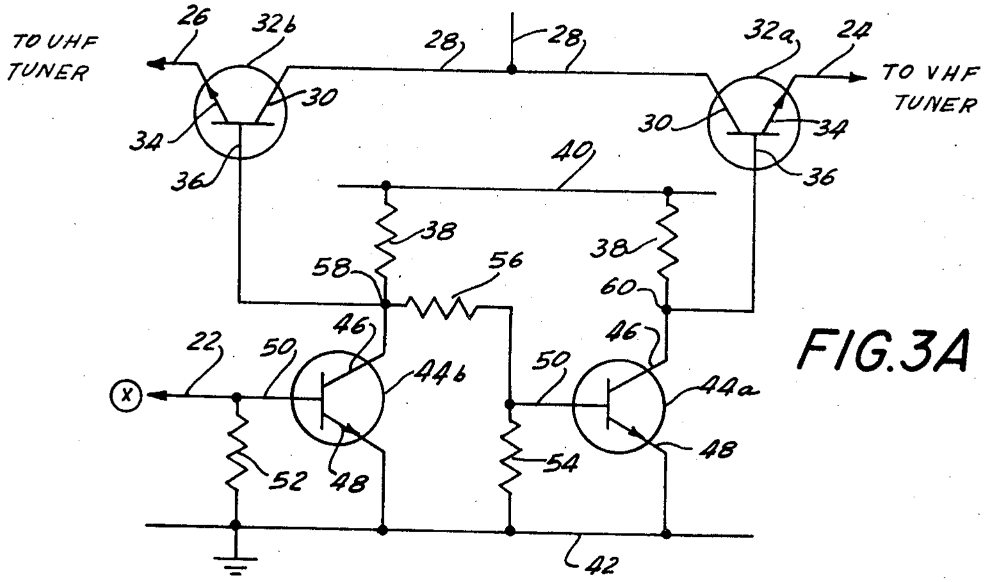
Figure 3C:
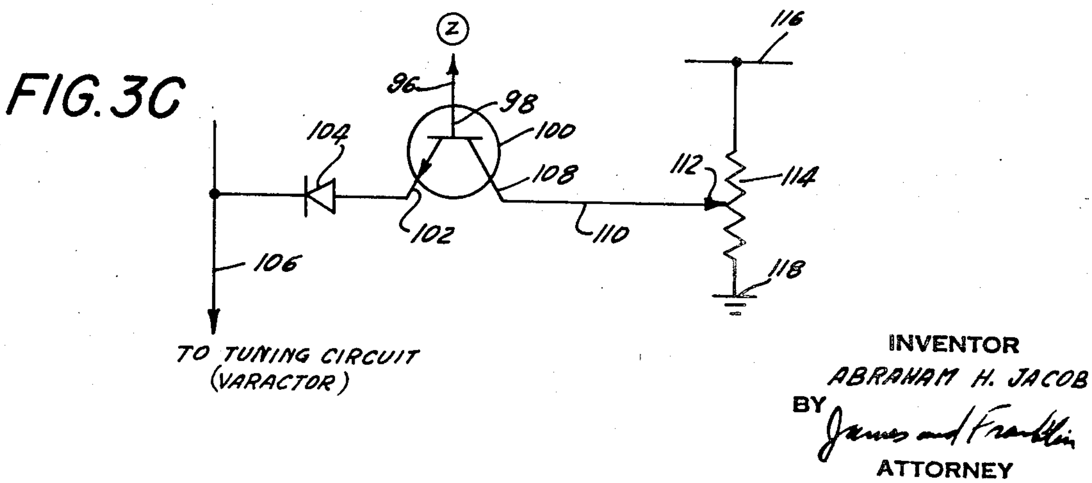

To the accomplishment of the above, and to such other objects as may hereinafter appear, the present invention relates to a tuning system, and to the circuitry employed therein, all as defined in the appended claims and as described in this specification, taken together with the accompanying drawings, in which FIG. 1 is a semi-schematic circuit diagram of the matrix connection between the AND gates and the selector switches, those switches being arranged in groups of units and tens switches and the matrix being correspondingly constructed. In this figure the utilization circuits actuated by the switches and potentially energizing the AND gates are shown only in block diagram form;

FIG. 2 is a diagram of one of the touch-type switches shown in FIG. 1, together with the pulse-producing and flip-flop circuitry associated therewith, and also showing typical circuitry which may be employed for generating a reset signal to the flip-flops, this circuitry constituting the utilization circuits shown in block-diagram form in FIG. 1;

FIG. 3*a* is a diagram of circuitry designed to be actuated by an AND gate and to effect selection of the UHF tuner or the VHF tuner;

FIG. 3*b* is a diagram of circuitry adapted to be connected to an AND gate and to effect selection of the high frequency band or the low frequency band within the VHF band; and FIG. 3*c* is a diagram of a circuit which may be employed to generate an appropriate varactor diode biasing voltage, thereby to effect tuning of the system to a particular frequency.

The actual tuning circuitry, that is to say, the circuitry employed to receive communication signals and translate them into intelligible forms, may take any known form, and is not here disclosed except so far as circuitry is disclosed for providing adjustable biasing voltages for that preferred embodiment where the tuning of the circuit is effected by means of varactor diodes. The details of tuning circuitry, both of the varactor diode type and of other types, is well known and forms no part of the present invention. The present invention is directed to a system for effecting channel or station selecting in a particular manner, without regard to the specific circuitry employed to converting the received intelligence signals into sound or picture. Moreover, although the system is specifically here disclosed in conjunction with the use of touch-type switches, it will be understood first that no claim is made to the novelty of such switches per se, and secondly that other types of switches may be employed. When, as is preferred, touch-type switches are employed, and when, as is preferred, they are arranged for digital tuning, the array of switches may be such as is disclosed in copending Patent Application ser. No. 130,198 , entitled TOUCH SWITCH ARRAY PANEL, filed by Abraham H. Jacob and John L. Frankeon Apr. 1, 1971 and assigned to the assignee of this application, but other touch-type switch structures could be employed if desired.

Turning now to FIG. 1, a set of "tens" switches generally designated 1 and a set of "units" switches generally designated 3 are provided, the tens switches corresponding to the numbers 0 – 9 being designated by the letters A – J respectively (for purposes of simplification only part of the thus defined switch array is specifically disclosed), while the units switches corresponding to the numerals 0 – 9 are represented by the letters K – T respectively (again, only some of those switches are here specifically shown). When the switches in question are of the touch-type, a common electrical contact 2 may be provided for each of the switches, while each of the switches in turn will have its own individual contact 4. The contact 2 is spaced from the contact 4, and a given switch is actuated when the operator places his finger as to bridge the space between the common terminal 2 and the selected individual terminal 4, thereby resistively electrically connecting them to one another. Each of the individual terminals 4 is operatively connected, as indicated by lead 6, to a utilization circuit 8. A source of power, such as the battery 10, is connected between the utilization circuits 8 and the common terminal 2, and when the space between the common terminal 2 and a particular terminal 4 is bridged, the circuit will be completed through the particular utilization circuit 8 associated with the particular switch energized, thereby producing an appropriate signal on its output line 12.

A matrix connection board, generally designated 5, is provided. It is schematically disclosed in FIG. 1. It comprises a plurality of "units" connection points shown in FIG. 1 as solid black dots and a plurality of "tens" connection points shown in FIG. 1 as open dots. These connection points are arranged in pairs, each pair consisting of a tens point and a units point, and therefore corresponding, as shown, to all of the numbers from 0 through 99. The output line 12 from switch K corresponding to the units numeral 0 is connected to a vertically extending row of units connection points shown at the extreme left in FIG. 1. The output line 12 from the switch L corresponding to the units numeral 1 is connected to a vertically extending row of units connection points next to the right of the K row, and other vertically arranged and electrically connected rows of units connection points corresponding to switches M, N, O, P, Q, R, S and T are correspondingly provided. The tens connection points are arranged in horizontal rows, with the uppermost row corresponding to switch A and hence to the numeral 0 in the tens category, the Row B next below the Row A corresponding to the numeral 1 in the tens category, and so on through horizontal rows C, D, E, F, G, H, I and J. Thus whenever a given tens switch, such as the switch I, is closed, its corresponding utilization circuit 8 will be energized, and a signal will be provided to each of the tens connection points on the appropriate horizontal row, in this case the row I representing the tens numeral 8. Similarly whenever a units switch is closed, such as the switch L, its utilization circuit 8 will be energized, and all of the connection points in the vertical row L representing the units numeral 1 will be provided with the signal. Thus energization of switches I and L corresponds to the number 81.

At the bottom of FIG. 1 a series of AND gates, generally designated 7, are disclosed. For purposes of simplicity only three such gates are shown, but the number can, of course, be varied in accordance with whatever may be desired for a given system. These AND gates 7, as here specifically shown, comprise a transistor 14 having a control electrode 16 and a pair of output electrodes 18 and 20. With a normal transistor, and as here illustrated, the control electrode 16 is the base, the electrode 18 may be the collector and the electrode 20 may be the emitter. The base 16 and collector 18 of each of the transistors 14 are connected to a preselected pair of units and tens connection points respectively corresponding to the number identification of the particular channel available in a given locality to be tuned. Thus the AND gate **7*a* has its electrode 16 connected to the units point 16*a* on line K and has its collector 18 connected to the tens point 18*a* on line H. The second AND gate 7*b* has its terminal 16 connected to terminal point 16*b* on units line M and has its collector 18 connected to terminal point 18*b* on tens line A. The AND gate 7*c* has its electrode 16 connected to terminal point 16*c* on units line P and has its collector 18 connected to terminal point 18*c*** on units line G.

Thus AND gate **7*a* is connected to the pair of terminal points corresponding to the number 70, AND gate 7*b* is connected to the pair of terminal points corresponding to number 02, and AND gate 7*c* is connected to the terminal points corresponding to the number 65. Hence AND gate 7***a* will be energized to provide an output signal on its emitter 20 whenever the switches corresponding to the number 70 are actuated, but at no other time, and similarly the AND gates 7*b* and 7*c* will have outputs from their emitter electrodes 20 only when switches corresponding to the number 02 and 65 respectively are energized and at no other times.

Three leads, designated respectively X, Y and Z, extend from each emitter 20. The lead X is designed to actuate a circuit such as the circuit shown in FIG. 3*a*, for conditioning the tuning device either for VHF or UHF actuation, depending upon the particular channel selected. In the examples here specifically given, channel 2 is VHF but channels 65 and 70 are UHF. Thus the lead X from each of the illustrated AND gates will, depending upon the specific nature of the VHF — UHF selection circuit, be used or not used. As will be seen below, the circuit of FIG. 3A will normally energize the UHF tuner and will only turn that tuner off and energize the VHF tuner when it is appropriately actuated. Consequently, connection between the UHF — VHF selector circuit and the AND gate lead X will be made only at AND gate 7*b*, since that is the only gate illustrated which is designed to select a VHF channel.

Lead Y may be employed to condition the VHF tuner, when that is operative, for operation either in the high or low band, as by means of a circuit such as is shown in FIG. 3B. Here again the lead Y from a given AND gate is operatively connected only where it can perform a function. Hence it is not connected for the UHF channels, and it is only connected for those of the VHF channels where its signal is required to cause the high-low band selector circuit to shift from its normal condition to another condition.

The lead Z from each of the AND gates 7 is designed to energize a particular frequency-controlling circuit, one embodiment of which is shown in FIG. 3C, that particular circuit, when energized, providing a signal which causes the tuner, selected and band-conditioned by the presence or absence of signals on leads X and Y, to tune to that frequency which corresponds to the particular frequency of the selected channel.

FIG. 3*a* discloses the details of a UHF — VHF selector circuit which may be employed. The output X from a given AND gate 7 is applied on line 22. Energizing outputs are applied on lines 24 or 26 to the VHF tuner and to the UHF tuner respectively. Energizing voltage for the tuners is applied on line 28 to the collectors 30 of transistors 32*a* and 32*b*, the output lines 24 and 26 being connected respectively to the emitters 34 of those transistors. The bases 36 of those transistors are connected via resistors 38 to a line of appropriate positive voltage 40. They are also respectively connected to a reference potential line 42 by means of transistors 44*a* and 44*b* respectively, the collectors 46 and emitters 48 of those transistors defining the output circuits thereof. The base 50 of transistor 44*b* is connected to line 22, which is in turn connected to reference potential by means of resistor 52. The base 50 of transistor 44*a* is connected to reference line 42 by means of resistor 54, and is also connected by means of resistor 56 to the collector 46 of transistor 44*b*. When there is no energizing signal on the base 50 of transistor 44*b*, that transistor will be off, the potential at point 58 will be high, transistor 32*b* will be on, and voltage will be applied to output line 26, energizing the UHF tuner. Because the voltage at point 58 is high, transistor 44*a* will be on, the voltage at point 60 will be low, transistor 32*a* will be off, there will be no voltage on output line 24, and consequently the VHF tuner will not be energized. On the other hand, when there is an energizing voltage on line 22, transistor 44*b* will be turned on, the voltage at point 58 will go down, transistor 32*b* will turn off, de-energizing the UHF tuner, transistor 44*a* will turn off, the voltage at point 60 will go up, transistor 32*a* will be turned on, and an energizing voltage will be applied on line 24 to the VHF tuner. Thus when there is no voltage on line 22, the UHF tuner is energized and when there is a voltage signal on line 22 the VHF tuner is energized. Hence it is only necessary to connect to the VHF — UHF switch circuit shown in FIG. 3*a* the leads X from those AND gates 7 corresponding to VHF channels.

FIG. 3*b* discloses a circuit designed for conditioning the VHF tuner to operate either in a high band or in a low band. The signal Y from an appropriate AND gate 7 is applied on line 62, and an output to a band selector switch is provided on line 64. Energizing voltage for the selector switch is provided on line 66, which is connected to line 64 via the emitter 68 and collector 70 of transistor 72. The collector 70 is connected to a suitable source (P) via resistor 71. The base 74 of transistor 72 is connected to point 76 on a voltage divider defined by resistors 78 and 80 connected in series with one another and in series with the collector 82 and emitter 84 of a transistor 86 between the voltage supply line 66 and a line 88 of reference potential. The base 90 of transistor 86 is connected to input line 62 and is connected to reference voltage line 88 by means of resistor 92. When there is no energizing signal on line 62, transistor 86 will be nonconductive so there will be no potential difference across resistor 78 and transistor 72 will be non-conductive, and so potential P will be applied on the output line 64, via resistor 71, thereby to actuate the switch for selecting the appropriate high or low bands. When a signal is present on line 62, transistor 86 will be conductive, the voltage at point 76 will fall, producing a potential difference across resistor 78 and the potential on line 64 will now effectively be the energizing voltage on line 66. This change in potential at line 64 changes the state of the high band, low band switch in the tuner. Hence the lead Y from a given AND gate 7 will be connected to lead 62 only in those instances where that AND gate 7 is connected to a pair of connection points corresponding to a VHF channel, and even then only where that channel is in that portion of the VHF band which required line 64 to have the potential of the energizing voltage on line 66.

FIG. 3C illustrates a circuit for providing the actual frequency tuning signal in those instances where the tuning is accomplished by means of some voltage-sensitive instrumentality such as a varactor diode. One of the voltage-producing circuits of FIG. 3C will be provided for each of the AND gates 7, with the lead Z from that AND gate being connected to line 96, which is in turn connected to the base 98 of transistor 100. The emitter 102 of that transistor is connected via a diode 104 to the line 106 which goes to the actual tuning circuit (as here specifically described, to the tuning varactors in that circuit). The collector 108 of the transistor 100 is connected by line 110 to the sliding tap 112 of the potentiometer 114 the resistive element of which is connected between the voltage source 116 and the source 118 of reference potential. The slider 112 for each potentiometer 114 will be manually pre-set to that voltage corresponding to the frequency of the particular channel with which it is designed to be associated. That voltage will be applied to the tuning circuit (to the varactors in that tuning circuit, as here specifically disclosed) only when the transistor 100 associated therewith is rendered conductive, and that will occur only when there is an appropriate energizing signal on lead Z from the corresponding AND gate 7.

FIG. 2 discloses the details of a preferred type of utilization circuit 8 together with control circuitry therefor including specific pulse producing circuitry. In FIG. 2 only a single touch-type switch is disclosed comprising the separated terminals 2 and 4. A source 200 of switch actuating potential, e.g. 30 volts, is connected to switch terminal 2 via resistors 202 and 204. Switch terminal 4 is connected to one terminal of a trigger device 206, here shown in the form of a neon discharge tube. The other terminal of the trigger device 206 is connected to point 208 between capacitor 210 and resistor 212. The capacitor 210 is connected to a source 214 of reference potential, and the resistor 212 is connected by means of line 216 to a source 218 of relatively high DC voltage, such as 125 volts. The trigger device 206 has the characteristics that it will become conductive at some striking voltage lower than 125 volts (e.g. 65–70 volts), and that it will become nonconductive if the voltage thereacross falls to some still smaller extinction value (e.g. 50–55 volts). It will be noted that the DC voltage across the switch terminals 2 and 4 is relatively low, only about 30 volts in the example here given (the voltage measured depends on the resistance between 2 and 4 during the measurement), whereas the voltage across the resistor-capacitor network 212, 210 is considerably higher, 125 volts in the example given. Thus the operator, when he places his finger to bridge the switch contacts 2 and 4, is exposed only to the low voltage values, and hence there is no possibility of danger to him. On the other hand, as will become apparent from the explanation to follow, the output from this circuit, provided at point 220, consists of voltage pulses having a much greater magnitude than thirty volts, these voltage pulses being of such short duration as not to represent a source of danger to the operator, but being sufficiently great in magnitude so as positively to affect and actuate the subsequent circuitry.

The pulse-producing circuit as described operates as follows: The capacitor 210 charges to 125 volts. When the circuit between switch terminals 2 and 4 is bridged, the finger of the operator constituting a bridging resistance thereacross, the voltage applied across the trigger device 206 is considerably greater than its striking voltage. The trigger device 206 then becomes conductive, and current is caused to start to flow through it and through resistor 212. As the current builds up through the resistor 212 the voltage at point 208 decreases, and when it decreases to a point where the voltage across the trigger device 206 is below its extinction voltage that device will become nonconductive. The capacitor 210 will then charge up again until the voltage at point 208 becomes large enough so that the voltage across the trigger device 206 exceeds its striking voltage, that device will again become conductive, and the sequence of pulse-production will continue. The AC resistance of the trigger device 206 is quite low, and hence the pulse current is relatively high even though the voltages involved, and particularly the DC voltage to which the operator is subjected, is quite low. In a given installation the resistor 212 may have a value of 4.7 megohm, and capacitor 210 may have a value of from 100 to 1,000 picofarads depending on circuit needs. As a result, pulses are produced at point 220 which are of appropriate size and duration reliably to actuate subsequent circuitry, such as a flip-flop circuit, and the fact that pulses are continuously produced by the circuit for as long as the switch contacts 2 and 4 are bridged adds greatly to the reliability of the circuit involved, since if one pulse does not actuate the subsequent circuitry, the next one probably will.

The circuitry actuated by the pulses thus produced is here disclosed in the form of a flip-flop circuit generally designated 222. It comprises cross-connected transistors 224 and 226, with the base of transistor 226 being connected to point 220 and to the collector of transistor 224 via resistor 204, and with the base of transistor 224 being connected to the collector of transistor 226 via resistor 228. Resistors 230 and 202 connect the collectors of transistors 226 and 224 respectively to the voltage source 200. The emitters of both transistors 224 and 226 are connected to voltage reference line 232. The output from this flip-flop circuit is taken at point 234, connected to the collector of transistor 224, and, as illustrated in FIG. 1, lead 12 connects this output point to the appropriate row of connection points in the matrix 5.

Resistors 236 and 238 are respectively connected at one end to the bases of transistors 224 and 226 respectively, and are connected at their other ends to lead 240 for receiving a reset signal. The flip-flop circuit 222 will normally be in a condition in which the transistor 224 is conductive and the transistor 226 is not conductive. As a result the voltage at point 234 will be approximately at reference potential. When a pulse is applied to point 220 through the action of the trigger device 206 the transistor 226 will be rendered conductive, and this will cause the flip-flop circuit 222 to shift its condition, the transistor 224 turning off. This will cause a high voltage to be applied to point 234, and that high voltage will be transmitted along the output line 12 to the matrix 5. At the same time, the conductivity status of transistor 226 will cause point 242 to drop in voltage. Neon indicator light 244 is connected between point 242 and point 243, the latter being on a voltage divider defined by resistors 245 and 247 connected across lines 218 and 214. When the potential at point 242 drops, neon indicator light 244 will light up, thus indicating that a particular flip-flop circuit has been actuated. The light 244 may be used on the switch array to indicate what switch it is that has been actuated, in known fashion. Thus the operator will actuate a given switch by bridging the appropriate contacts, he will keep his finger in place until the light 244 corresponding to the desired switch is illuminated, and he will then know that that switch has done its work, and that the appropriate terminal point on the matrix 5 has been energized corresponding either to the units or tens numeral involved, as the case may be.

Each time that a given flip-flop circuit 222 shifts from its normal position to its actuating condition, the voltage at point 234 will rise from a reference potential to a higher potential. This will cause a pulse to pass through capacitor 246 onto line 248. The lines 248 from all of the tens flip-flop circuits 222 go to a reset generator generally designated 250, and the lines 248 from all of the units flip-flop circuits 222 go to another reset generator 250. Those generators may each comprise transistor 254 the collector-emitter circuit of which is connected between reference line 214 and positive voltage line 255 in series with resistor 256. The base of transistor 254 is connected to line 232 via resistor 258, and is also connected by line 260 to the input signal line 248. The emitter of transistor 254 is connected by capacitor 262 to point 264, that point being connected between reistors 266 and 268 in series across the lines 232 and 255 and also being connected to the base of transistor 270, whose emitter-collector circuit is connected across the lines 214, 255, in series with resistors 272 and 274. The collector of transistor 270 is also connected by capacitor 276 to output line 278, and to reference line 214 via resistor 280. The output line 278 is connected to the lines 240 of each of the flip-flop circuits 222 associated with that particular reset generator 250. Each time that any one of the flip-flop circuits 222 is actuated to shift from its normal condition to its actuated condition the reset pulse generator 250 is energized to produce a pulse which will cause all of the other flip-flop circuits 222 which are not then being pulse-actuated to remain in or return to their original stand-by condition.

The pulse-producing circuit can be readily designed to produce pulses of appropriate magnitude and duration. The larger the capacitance of capacitor 210, the longer will be the pulses. The operating characteristics of the trigger device 206 will determine the voltage characteristics of the pulses, and high voltages may be employed with safety because of the short duration of the pulses. It is not necessary that the trigger device 206 be turned completely off in order to produce voltage pulses; it may be, particularly if it is of the neon glow-lamp type, that it will be turned only fractionally off or on, but whether it goes completely off or not, a train of pulses will be produced, thus making the device safe and extremely reliable.

By means of the system here disclosed a standardized tuner may be made which can be adapted in the field to the selection of particular desired channels, with that selection being accomplished in a digital fashion and preferably by means of touch switches. Channel, band and sub-band selection are effected wholly or substantially in an electrical manner and without moving parts (although it will be understood that moving part selection may be employed where desired or appropriate). The standard tuner construction provides full digital capacity, and provides for the tuning of a predetermined number of channels normally fewer in number than the digital selection capability of the standard switch array. Through the use of a connection matrix in conjunction with the individual digital switches, simplified and standardized construction is achieved. The pulse-producing and flip-flop circuits associated with each switch, and the use of those circuits in conjunction with AND gates connected to the desired pair of connection points on the matrix, gives the system the ultimate in flexibility and reliability.

While but a single embodiment of the present invention has been here specifically disclosed, it will be apparent that many variations may be made therein, all within the scope of the following claims.

I claim:

1. A pulse-producing circuit comprising a voltage source, a resistor and capacitor connected thereacross, and an output circuit connected across said capacitor but not said resistor, said output circuit comprising, in series with one another, a trigger device, the normally open but closable contacts of a switch, and means for connecting thereto a utilization circuit adapted to be used in combination with said pulse-producing circuit, said trigger device having the characteristic of becoming conductive when the voltage thereacross is at a first value no greater than that of said voltage source and then becoming nonconductive when the voltage thereacross is at a second value less than said first value, the values of the circuit components being such that when steady state current flows through said trigger device and said closed switch the voltage drop through said circuit components, including said resistor, gives rise to a voltage across said trigger device which is less than said second value, thereby causing said trigger device to become non-conductive even though said switch remains closed, and, in combination therewith, television tuner means operatively connected to said utilization circuit and effective to change its tuning status when the latter is pulsed by said pulse-producing circuit.

2. The pulse-producing circuit of claim 1, in which said switch comprises a pair of spaced terminals adapted to be operatively bridged by the finger of the operator.

3. The pulse-producing circuit of claim 1, in which said trigger device is a gas-filled tube.

4. The pulse-producing circuit of claim 3, in which said switch comprises a pair of spaced terminals adapted to be operatively bridged by the finger of the operator.

5. A pulse-producing circuit comprising a voltage source, a resistor and capacitor connected thereacross, and an output circuit connected across said capacitor, said output circuit comprising, in series, a trigger device, the normally open but closable contacts of a switch, and means for connecting thereto a utilization circuit adapted to be used in combination with said pulse-producing circuit, said trigger device having the characteristic of becoming conductive when the voltage thereacross is at a first value no greater than that of said voltage source and then becoming nonconductive when the voltage thereacross is at a second value less than said first value, the values of the circuit components being such that when steady state current flows through said trigger device the voltage drop through said circuit components, including said resistor, gives rise to a voltage across said trigger device which is less than said second value, said utilization circuit comprising flip-flop circuit means normally in a first condition, shiftable to a second condition upon receipt of a pulse from said pulse-producing circuit, and reset pulse generator means operatively connected to said flip-flop circuit means and effective when said flip-flop circuit means is in said second condition to produce an output which resets said flip-flop circuit means in its first condition.

6. In combination with the pulse-producing circuit of claim 5, television tuner means operatively connected to said flip-flop circuit means and effective to change its tuning status when said flip-flop circuit means shifts from said first to said second condition.

7. The circuit of claim 5, in which said trigger device is a gas-filled tube.

8. In combination with the pulse-producing circuit of claim 7, television tuner means operatively connected to said flip-flop circuit means and effective to change its tuning status when said flip-flop circuit means shifts from said first to said second condition.

9. The circuit of claim 7, in which said switch comprises a pair of spaced terminals adapted to be operatively bridged by the finger of the operator.

10. In combination with the pulse-producing circuit of claim 9, television tuner means operatively connected to said flip-flop circuit means and effective to change its tuning status when said flip-flop circuit means shifts from said first to said second condition.

11. The circuit of Claim 5, in which said switch comprises a pair of spaced terminals adapted to be operatively bridged by the finger of the operator.

12. In combination with the pulse-producing circuit of claim 11, television tuner means operatively connected to said flip-flop circuit means and effective to change its tuning status when said flip-flop circuit means shifts from said first to said second condition.

13. A television tuning system comprising a first set of switches corresponding respectively to units digits, a second set of switches corresponding respectively to tens digits, a support, a matrix of units and tens connection points on said support, a plurality of said units points being connected to each of said units switches respectively and a plurality of said tens points being connected to each of said tens switches respectively, said points being arranged in pairs corresponding to units-and-tens numbers, a plurality of selectively actuatable tuning control means effective when actuated to tune a receiver to a particular channel identified by a units-and-tens number, each of said tuning control means being actuatingly connected to that pair of connection points corresponding to its particular units and tens identifying number.

14. The television tuning system of claim 13, in which said switches are connected to their respective sets of points via the pulse-producing circuit of claim 1.

15. The television tuning system of claim 13, in which the number of said pairs of points in said matrix is greater than the number of said tuning control means.

16. The television tuning system of claim 15, in which said switches are connected to their respective sets of points via the pulse-producing circuit of claim 1.

17. The television tuning system of claim 15, in which said switches are connected to their respective sets of points via a pulse-producing circuit.

18. The television tuning system of claim 17, in which said tuning control means comprises flip-flop circuit means which shifts from one condition to another on receipt of a pulse from said pulse-producing circuit.

19. The television tuning system of claim 13, in which said switches are connected to their respective sets of points via a pulse-producing circuit.

20. The television tuning system of claim 19, in which said tuning control means comprises flip-flop circuit means which shifts from one condition to another on receipt of a pulse from said pulse-producing circuit.

* * * * *